(12) United States Patent
Leung et al.

(10) Patent No.: US 10,146,416 B2
(45) Date of Patent: Dec. 4, 2018

(54) SYSTEMS AND METHODS FOR SENSORY INTERFACE

(71) Applicant: Ingenious.Ventures, LLC, Berkeley, CA (US)

(72) Inventors: Theobolt N. Leung, San Francisco, CA (US); Steven E. Marder, Berkeley, CA (US)

(*) Notice: Subject to any disclaimer, the term of this patent is extended or adjusted under 35 U.S.C. 154(b) by 0 days.

(21) Appl. No.: 14/609,425

(22) Filed: Jan. 29, 2015

(65) Prior Publication Data
US 2015/0212722 A1 Jul. 30, 2015

Related U.S. Application Data

(60) Provisional application No. 61/933,278, filed on Jan. 29, 2014.

(51) Int. Cl.
| | |
|---|---|
| *G06F 21/00* | (2013.01) |
| *G06F 3/0484* | (2013.01) |
| *H04L 29/08* | (2006.01) |
| *G06F 21/31* | (2013.01) |
| *G06F 21/32* | (2013.01) |
| *G06F 3/01* | (2006.01) |
| *G06Q 50/00* | (2012.01) |
| *H04L 29/06* | (2006.01) |

(52) U.S. Cl.
CPC .......... *G06F 3/04847* (2013.01); *G06F 3/011* (2013.01); *G06F 3/016* (2013.01); *G06F 3/04842* (2013.01); *G06F 21/31* (2013.01); *G06F 21/32* (2013.01); *G06Q 50/01* (2013.01); *H04L 67/10* (2013.01); *H04L 67/12* (2013.01); *H04L 67/42* (2013.01)

(58) Field of Classification Search
CPC ...... G06F 21/31; G06F 21/32; G06F 3/04842; G06F 3/04847; G06F 3/011; G06F 3/016; G06F 3/0484; H04L 67/10; H04L 67/12; H04L 67/42; G06Q 50/01
See application file for complete search history.

(56) References Cited

U.S. PATENT DOCUMENTS

| | | | | |
|---|---|---|---|---|
| 2007/0255953 | A1* | 11/2007 | Peyret | H04L 9/32 713/168 |
| 2008/0027984 | A1* | 1/2008 | Perdomo | G06Q 10/107 |
| 2013/0324092 | A1* | 12/2013 | Scott | H04M 3/533 455/413 |

(Continued)

*Primary Examiner* — Joseph P Hirl
*Assistant Examiner* — Chi Nguy
(74) *Attorney, Agent, or Firm* — Redbrick IP, P.C.

(57) ABSTRACT

Systems, methods, and protocols for sensory memes are disclosed. Such a system can include: a computer processor and a sensory module configured to execute on the computer processor to enable the computer processor to: receive, from a first computing device, a sensory meme including multiple sensory signals, the sensory meme defined based on instructions from a first user; provide the sensory meme for playback by a second computing device, the playback involving concurrent output of the sensory signals, the second computing device receiving user input in response to playback of the sensory meme; receive a request from the second computing device after playback of the sensory meme; and provide content to the second computing device in response to the second request.

19 Claims, 10 Drawing Sheets

(56) References Cited

U.S. PATENT DOCUMENTS

| | | | |
|---|---|---|---|
| 2014/0340206 A1* | 11/2014 | Bugg, Jr. | G08B 7/00 340/326 |
| 2014/0344694 A1* | 11/2014 | Gomersall | G06F 3/0481 715/719 |
| 2015/0172246 A1* | 6/2015 | Velummylum | H04L 51/18 709/206 |
| 2017/0149600 A9* | 5/2017 | Kamrani | H04L 29/06353 |

* cited by examiner

SYSTEMS AND METHODS FOR SENSORY INTERFACE

CROSS-REFERENCE TO RELATED APPLICATIONS

This application claims the benefit of U.S. Provisional Application No. 61/933,278, "SYSTEMS AND METHODS FOR SENSORY INTERFACE," filed Jan. 29, 2014, the entire disclosure of which is incorporated by reference herein, in its entirety, for all purposes.

SUMMARY

In general, in one aspect, the invention relates to a system for using a sensory meme. The system can include: a computer processor and a sensory module configured to execute on the computer processor to enable the computer processor to: receive, from a first computing device, a sensory meme including multiple sensory signals, the sensory meme defined based on instructions from a first user; provide the sensory meme for playback by a second computing device, the playback involving concurrent output of the sensory signals, the second computing device receiving user input in response to playback of the sensory meme; receive a request from the second computing device after playback of the sensory meme; and provide content to the second computing device in response to the second request.

In general, in one aspect, the invention relates to a method for using a sensory meme. The method can include: receiving, from a first computing device, a sensory meme including multiple sensory signals, the sensory meme defined based on instructions from a first user; providing the sensory meme for playback by a second computing device, the playback involving concurrent output of the sensory signals, the second computing device receiving user input in response to playback of the sensory meme; receiving a request from the second computing device after playback of the sensory meme; and providing content to the second computing device in response to the second request.

In general, in one aspect, the invention relates to a non-transitory computer-readable storage medium having instructions for using a sensory meme. The instructions are configured to execute on at least one computer processor to enable the computer processor to: receive, from a first computing device, a sensory meme including multiple sensory signals, the sensory meme defined based on instructions from a first user; provide the sensory meme for playback by a second computing device, the playback involving concurrent output of the sensory signals, the second computing device receiving user input in response to playback of the sensory meme; receive a request from the second computing device after playback of the sensory meme; and provide content to the second computing device in response to the second request.

Other aspects of the invention will be apparent from the following description and the appended claims.

BRIEF DESCRIPTION OF THE DRAWINGS

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyrights whatsoever.

Embodiments of the present invention are illustrated by way of example, and not by way of limitation, in the figures of the accompanying drawings and in which like reference numerals refer to similar elements.

DETAILED DESCRIPTION

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims.

Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

In general, embodiments of the invention provide methods and systems for using sensory interfaces and/or data obtained from sensory interfaces (e.g., in a high-bandwidth application). In one or more embodiments, a sensory meme is a collection of one or more sensory outputs (e.g., defined by a user). The sensory meme can be created to uniquely or otherwise identify a user or collection of users.

In one or more embodiments of the invention, a sensory meme can be used to convey information between users. In these embodiments, the sensory meme can include a collection of outputs which, when output in a predefined manner (e.g., sequence), convey information (e.g., sentiment, intent, context, decisions, etc.).

Figure 1A:
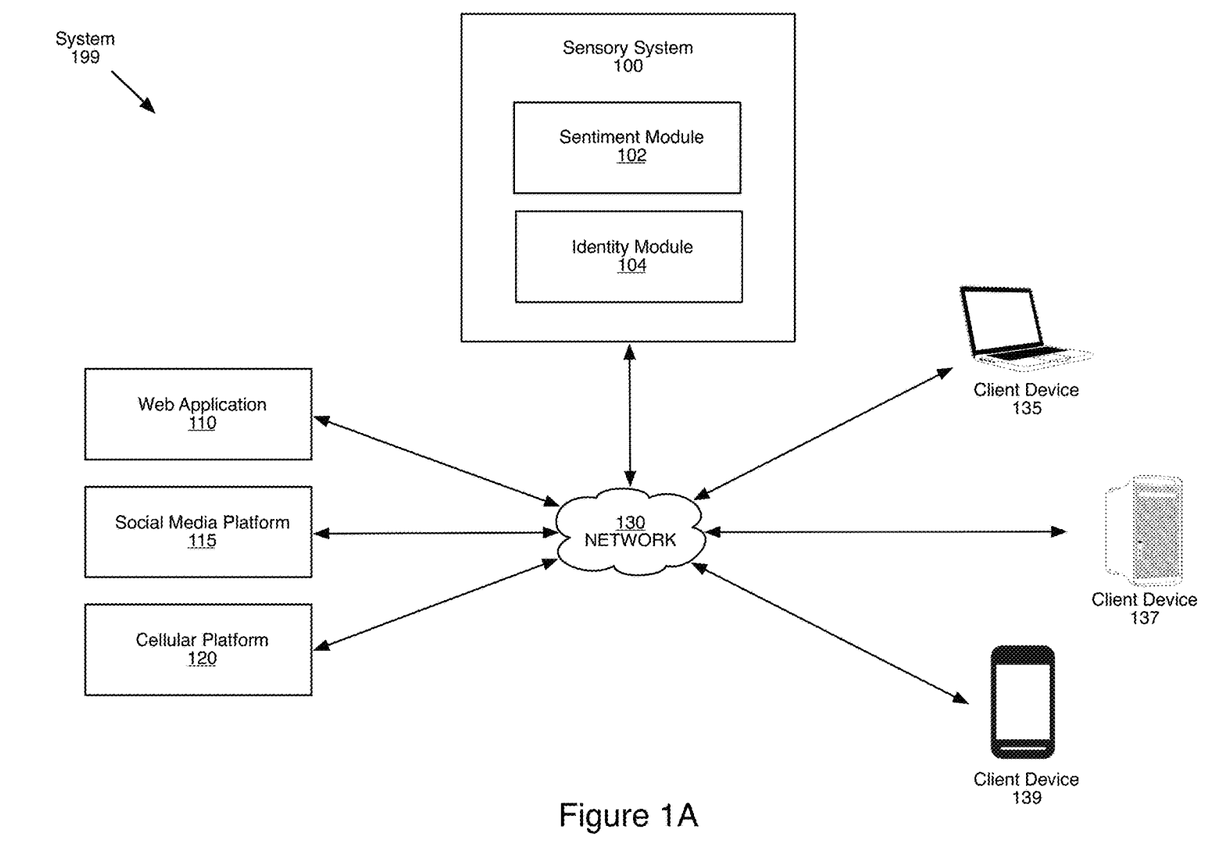
FIGS. 1A and 1B show schematic diagrams of systems, in accordance with one or more embodiments of the invention.

FIG. 1A shows a system (199) in accordance with one or more embodiments of the invention. As shown in FIG. 1A, the system (199) has multiple components including a sensory system (100) (also known as a "sensory module") including a sentiment module (102) and a identity module (104), a web application (110), a social media platform (115), a cellular platform (120), client devices (135, 137, and 139), and a network (130). Various components of the system (199) can be located on the same device (e.g., a server, mainframe, desktop Personal Computer (PC), laptop, tablet, netbook, mobile phone, cable box, and any other device) or can be located on separate devices connected by a network (e.g., a personal area network (PAN) of connected devices, a local area network (LAN), the Internet, etc.). For example, the client devices (135, 137, and 139) can include wearable computing devices, telemetry sensors, local/global positioning devices (e.g., Apple Corporation's iBeacon devices), and/or a variety of other devices. Those skilled in the art will appreciate that there can be more than one of each separate component executing on a device, as well as any combination of these components within a given embodiment of the invention.

In one or more embodiments of the invention, the sensory system (100) includes functionality to receive, store, and/or transmit sensory memes between entities. In one or more embodiments of the invention, a sensory meme is any collection of data defining one or more outputs/behaviors of one or more sensory devices. In a basic example, a sensory meme can be a data structure defining a 2 second vibration action to be performed by an actuator, followed by playback of a predefined audio snippet by a speaker.

Categories of sensory outputs usable in the creation and/or playback of a sensory meme, in accordance with various embodiments of the invention, can include but are not limited to:

Optical
Acoustic
Mechanical
Electrical
Magnetic
Radiological
Thermal

Thus, the examples above, including haptic, light, images, electrical and thermal, audio, and/or any combination of one or more sensory devices can be used to construct an N-dimensional sensory meme, where N is a parameter of sensory outputs defined by the sensory meme (e.g., Focus×Direction×Velocity).

Figure 1B:
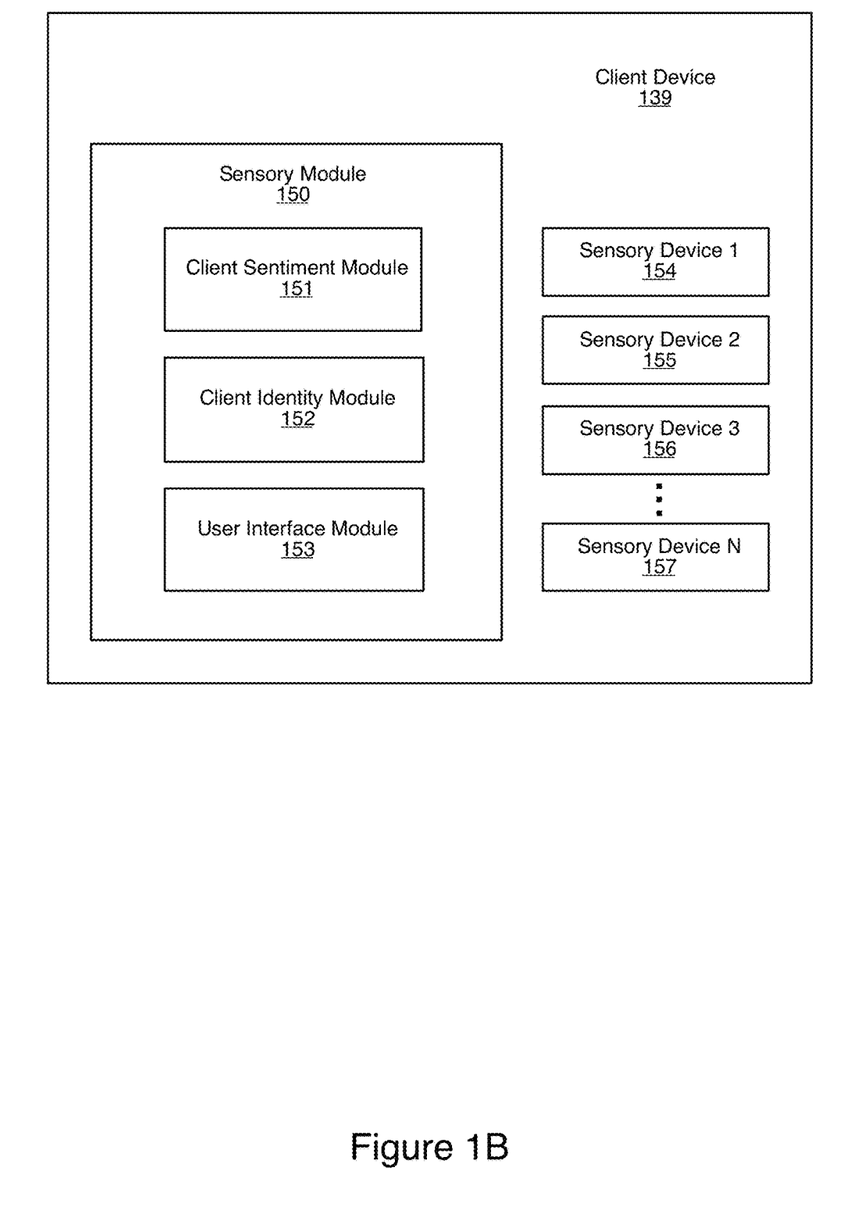

FIG. 1B depicts a schematic diagram of the exemplary client device (139) of FIG. 1A, in accordance with one or more embodiments of the invention. As shown in FIG. 1B, the client device (139) has multiple components including a sensory module (150), client sentiment module (151), client identity module (152), user interface module (153), and any number of sensory devices (154, 155, 156, 157).

In one or more embodiments of the invention, the client device (139) includes functionality to record signals of a sensory meme, create a sensory meme from one or more recorded signals, and/or playback a received sensory meme. A signal can be any recorded sensory input that can then be represented to a user via output (e.g., playback) using a client computing device. A client device can be a single device or a number of related devices, and can include any number of sensory devices (with input and/or output functionality). In one or more embodiments of the invention, the following are examples of sensory devices usable in the creation and/or playback of a sensory meme:

Directional haptics—piezoelectric devices providing controllable X,Y,Z axes, amplitude, frequency, and waveforms. For example, the device can be configured to record the heartbeat of a holding user and to identify the user via their EKG/electrical signature. In one or more embodiments, a sensory module of the device (or an external sensory module) can then convert the electrical signature into a waveform that can be played back like a ringtone with a piezoelectric recording of a handshake or a kiss. This becomes the user's secure digital sensory meme which can then be used for any number of applications including, but not limited to, authentication, execution of contracts/agreements, to perform conditional logic (e.g., make a decision to perform an action), and etc.

Image—user interface elements including videos and/or blink rate/intensity of a light emitting device can be synchronized with piezo, audio, thermal and electrical signals within a sensory meme.

Light—a transparent membrane partially or wholly surrounding the device that transmits light, providing a controllable glow.

Audio—sounds, beeps, clicks, growls, musical tracks, voice tracks in full range audible or otherwise range (e.g., deep base).

Electrical—run current across two poles to tickle and/or shock a user.

Thermal—heat pump to transport heat to or from a surface of the device.

Magnetic—control the magnetic field around the device—attach it to a refrigerator. repulse it from an opposing magnetic field to physically adjust its position in 3 dimensions.

Radiology—allow the device to charge other devices when in physical proximity (e.g., Wifi or gamma particles).

Time—The temporal dimension of the sensory meme can be used to differentiate otherwise similar signals. For example, a user can use a client device to select and record signals for inclusion in a sensory meme. Furthermore, the user can separate or mix the recorded signals according to a desired playback timing in order to customize the sensory meme even further.

Wearables—wearable sensory devices (e.g., bracelet, watch, embedded materials in clothing, etc.) can track and record body movement, temperature, velocity, moisture, perspiration, bodily functions (e.g., to determine whether an infant's diaper needs to be changed), etc.

In one or more embodiments of the invention, the sensory module (150) is a software application or set of related applications executing on the client device (139). The sensory module (150) can be configured to obtain (e.g., from a remote entity such as sensory system 100), create, and/or send one or more sensory memes. The sensory module can optionally include a client sentiment module (151) for aggregating and/or associating sentiment with a sensory meme, a client identity module (152) for aggregating and/or associating identity information with a sensory meme, and/ or a user interface module (153) for directly or indirectly interfacing with one or more sensory devices (e.g., 154, 155, 156, 157). In one or more embodiments of the invention, the sensory module (150) includes functionality to associate a variety of information with a sensory meme, including but not limited to intent, context, decisions, and/or any other information conveyed between users. Sentiment information associated with a sensory meme can be defined explicitly, implicitly, and/or inferred.

Returning to FIG. 1A, in one or more embodiments of the invention, the sensory system (100) includes functionality to provide sensory memes in response to requests (e.g., identity requests, sentiment requests, etc.). Thus, for example, the sensory system (100) can be used to facilitate the exchange of sensory memes between clients and through any number of intermediary communication protocols/services (e.g., web application (110), social media platform (115), cellular platform (120)).

For example, a user of a social networking platform can define a sensory meme using a client device (e.g., 139). Subsequently, the sensory system (100) may share that sensory meme with other users of the social networking platform in response to a request from the user. In another example, a web application (e.g., 110) can be configured to request a sensory meme from the sensory system (100) as part of a knowledge-based authentication protocol (e.g., challenge-response). In this example, the web application can output the sensory meme to the user in order to verify the identity of the application to the user prior to requesting authentication credentials from the user. In yet another example, the sensory system (100) can be configured within or communicatively coupled to a cellular platform (120) and can enable a user to define and upload a sensory meme with the user's mobile device, and then provide those sensory memes as a ringtone and/or alert for communications from that user (e.g., text messages, calls, etc.).

In one example of an application of a sensory meme, a user of a mobile device records, by a mobile device, a full-sensory sensory meme as their 'ringtone' fingerprint. In this example, the user shares the sensory meme with other users of a social networking platform using the mobile device. In this manner, the sensory meme ringtone serves as a unique and kinesthetically memorable identifier of the user.

In another example, a movie production company uses a variety of recording equipment to record multiple dimensions of a feature film. In this example, in addition to the audio/video dimensions, the movie is recorded with a haptic vibration dimension which vibrates to indicate movement/intensity, a thermal layer which heats and cools to indicate mood/intensity, a lighting dimension which controls the angle/intensity of lighting (e.g., sun light), a precipitation dimension which controls simulated precipitation/humidity, a wind dimension that controls wind direction/velocity, a temperature dimension, an odor dimension, and/or an interactive point of view control layer that allows the user to modify the viewing perspective using a joystick control. In this example, the standard audio/video release of the film is sold at a certain price, while additional dimensions are sold as premium options (e.g., each for an additional cost). Thus, the film can be released in a variety of different versions according to a tiered pricing model (e.g., 2-D for $20, 3-D for $25, 4-D for $30, 5-D for $35, etc.)

Generally, in one or more embodiments of the invention, the sensory module (150) includes functionality to receive, store, and provide sensory memes associated with intent, context, decisions, and/or any other information conveyed between users.

In one or more embodiments of the invention, the sentiment module (102) includes functionality to receive, store, and provide sensory memes associated with sentiment. The sentiment module (102) may be configured to identify a sentiment associated with each sensory meme (e.g., by the user) or may be configured to automatically detect and/or associate one or more sentiment values with the sensory memes. The sentiment module (102) can be configured to aggregate sentiment information associated with multiple sensory memes of multiple client devices and to provide the sentiment information to any number of client devices for display and selection by a user (or for associating with new sensory memes).

In one or more embodiments of the invention, the identity module (104) includes functionality to associate an identity with one or more sensory memes. The identity may comprise a name, telephone number, social media account, email address, and/or any combination of one or more attributes of a user. The identity module (104) can be configured to retrieve and provide one or more matching sensory memes in response to a request including an identity. The identity module (104) can be configured to aggregate identity information associated with multiple sensory memes of multiple client devices and to provide the identity information to any number of client devices for a variety of uses (e.g., authentication, notification, social content sharing, etc.).

In one or more embodiments of the invention, the sensory system (100) and sensory module (150) include functionality to implement a protocol for creating, sending, receiving, and/or processing sensory memes. The protocol can include a standard format for transmission, encryption, decryption, recording, and/or distribution of sensory memes and/or data related to sensory memes. For example, the protocol can include definition of a format for creating one or more data structures. The data structure can be implemented, for example, as a JavaScript Object Notation (JSON) object including references to binary sensory data (e.g., audio, video, haptic, and etc. data). The protocol can further include definitions of taxonomy, syntax, application programming interface (API) format, and/or any other requirements for standardized creation and sharing of sensory memes among heterogeneous computing devices and platforms.

In one or more embodiments of the invention, the sensory system (100), sentiment module (102), and identity module (104) are components of a server application or collection of applications executing on one or more communicatively enabled server computing devices. For example, sensory system (100) can be implemented as a web application executing in a cluster computing environment.

In one or more embodiments of the invention, the social media platform (150) is a platform for facilitating the exchange of content (e.g., text, audio, video, images, etc.) between one or more entities. For example, the social media platform (150) may store millions of accounts of individuals, businesses, and/or other entities. One or more users of each account may use the social media platform (150) to send content to other accounts inside and/or outside of the social media platform (150).

Figure 3:
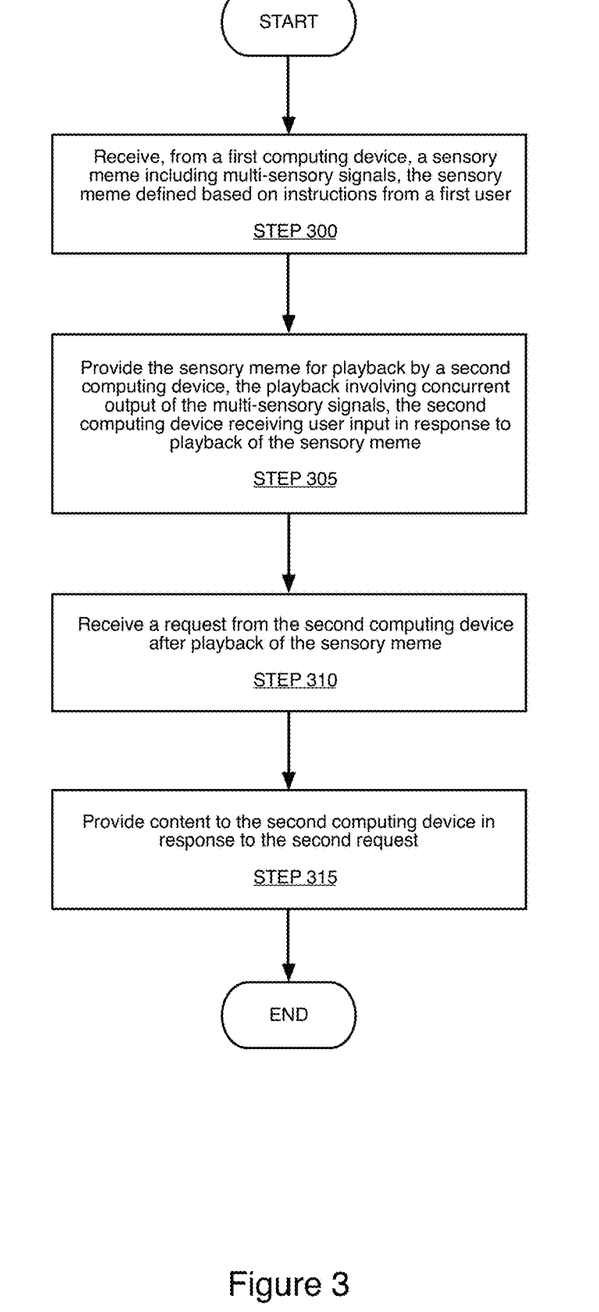
Figure 4:
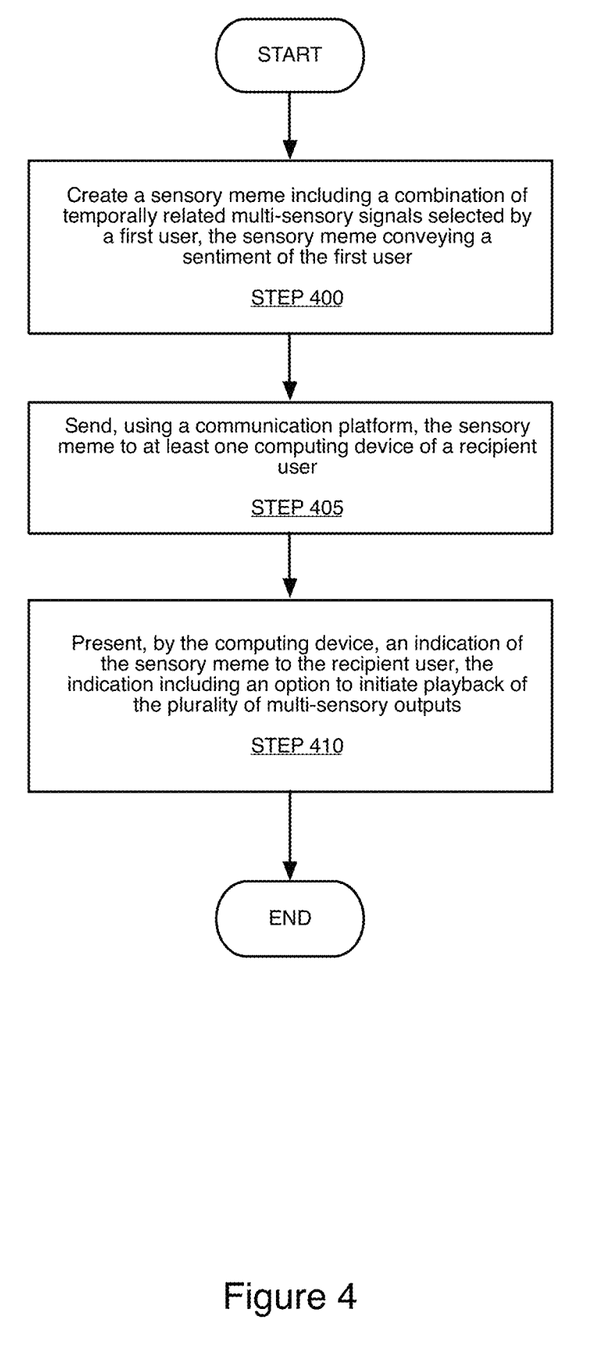

In one or more embodiments of the invention, the client device (e.g., 135, 137, 139) is a hardware computing device including one or more processors capable of executing software. Examples of a computing device may include, but are not limited to, a smartphone, a tablet computer, a netbook, a laptop computer, a desktop computer, an automotive computer system, a gaming console, and/or any other standalone or embedded system including a user interface. The sensory module (150), client sentiment module (151), client identity module (152), and/or user interface module (153) may be part of a software application executing on the computing device, or may be partially or entirely integrated within an operating system or other application of the computing device, in accordance with various embodiments of the invention. FIGS. 3 and 4 (described below) depict examples of such a device.

Although the components of system 199 are depicted as being directly communicatively coupled to one another, this is not necessarily the case. For example, one or more of the components of system 199 may be communicatively coupled via a distributed computing system, a cloud computing system, or a networked computer system communicating via the Internet.

Many other devices or subsystems may be connected to the system (199). Conversely, all of the components and devices illustrated in FIGS. 1A and 1B need not be present to practice the embodiments described herein. The devices and subsystems referenced above may also be interconnected in different ways from that shown in FIGS. 1A and 1B. The system (199) may also employ any number of software, firmware, and/or hardware configurations. For example, the example embodiments disclosed herein may be encoded as a computer program (also referred to as computer software, software applications, computer-readable instructions, or computer control logic) on a computer-readable medium.

Biometrics

In one or more embodiments of the invention, the client device includes functionality to detect motion data (e.g., using a gyroscope, accelerometer, camera, etc.) corresponding to a user's movement. The client device can apply a biometric statistical models (e.g., aggregated skeletal data) to the captured sensory data in order generate recommendations for improving or correcting one or more predefined movements or actions.

For example, the client device can be configured to compare a user's range of motion, speed, vertical/horizontal alignment, and etc. with data aggregated from hundreds or thousands of other individuals. The client can be configured to determine whether the user's data falls outside of a predefined threshold and, if so, to trigger a recommendation accordingly. Furthermore, in one or more embodiments, the sensory module (150) of the client device is configured to filter out noise and improbable movements (e.g., a finger bending backwards to back of hand).

In one or more embodiments, the sensory system (100) can be configured to centralize the medical and physiotherapy database on human physiological parameters (e.g. for joint range of motion, bone and limb lengths/proportions, standing posture, seated posture, gait, etc.). The sensory system (100) can further be configured to organize and create a standard taxonomy and to provide the taxonomy data to the client for real-time analysis or to perform the analysis server-side in response to a request from the client.

The sensory system (100) can further be configured to enable customization and training by customizing the taxonomy to better fit the body language of the subject user. The sensory system may be configured to perform pain and comfort detection. For example, the sensory system (100) may provide a level of probability that the posture is painful, or indicative of an underlying injury.

The aforementioned functionality of the sensory system (100) can optionally be implemented partially or entirely in a client device. Thus, for example, the sensory module (150) of client (139) can be configured to obtain the taxonomy data, analyze sensory data from one or more sensory devices, and to provide recommendations to the user.

Application Examples

1. Physiotherapy Range of motion measurement app.
2. Physical rehabilitation feedback and games.
3. Population health management systems—use aerial motion capture drones to monitor the health of populations by identifying the biometrics of each individual and plot them against the normal curve for that species (not necessarily limited to human beings). In one or more embodiments, the client device can create or cause to be created, a sensory meme for the user from the user's captured sensory data. Thus, the same data can be used for both identity confirmation and biometric analysis.
4. Remote Biometric Monitoring: A parent caring for a child or a person caring for an elderly relative can receive notifications sent by a biometric sensory device to a mobile device of the caretaker. The notification can include biometric information detected by the sensory (e.g., movement, sound, voice activated commands, heart rate, etc.) at predefined periodic intervals or in response to a trigger (e.g., heart rate dropped below a threshold).
5. Remote Biometric Monitoring: Couples can remotely interact with one another using touch, vibration, pressure, and/or temperature stimulation.

Human Powered Devices

In one or more embodiments of the invention, the client device comprises and/or is communicatively coupled with one or more wearable sensors. A wearable sensor can be, in one embodiment, an input/output device that does not require batteries. The following are a list of example implementations of such a device, in accordance with one or more embodiments of the invention:

A mechanical button generates an electric current when pressed. The electric current is used to send a low-power wireless signal (e.g., Bluetooth low energy).

A piezo-electric material or combination of materials with no moving parts is configured to generate the current required for a wireless signal. In this example, the properties of the device are reversible such that when a higher power wireless signal is sent through the material, the material will buzz. Thus, the device is configured to provide both input and output capabilities and haptic domain.

A thermoelectric material embedded in a wearable device is configured to generate an electric signal using heat generated by a user's skin or clothing. The electric current is used to send a low-power wireless signal in order to power an electro-piezo device. The electro-piezo device then vibrates in response to the wireless signal. In one or more embodiments, the reversibility of these properties allows a material to heat up or cool down when powered by a wireless signal.

A high power wireless signal causes a photo-electric device to emit light. The photo-electric device can be configured to utilize a radiation by-product of another device to generate an electric signal powering an input/output unit. For example, radiation generated by a cellular phone can be used to power a light-emitting diode, or any number of other devices.

A self winding or kinetic watch. In addition to mechanical designs utilizing an internal weight and motion of the watch to wind a spring or charger battery, solid state materials, such as the thermal, photo-electric, and other devices discussed above, can be used to charge/power the watch.

Figure 2:
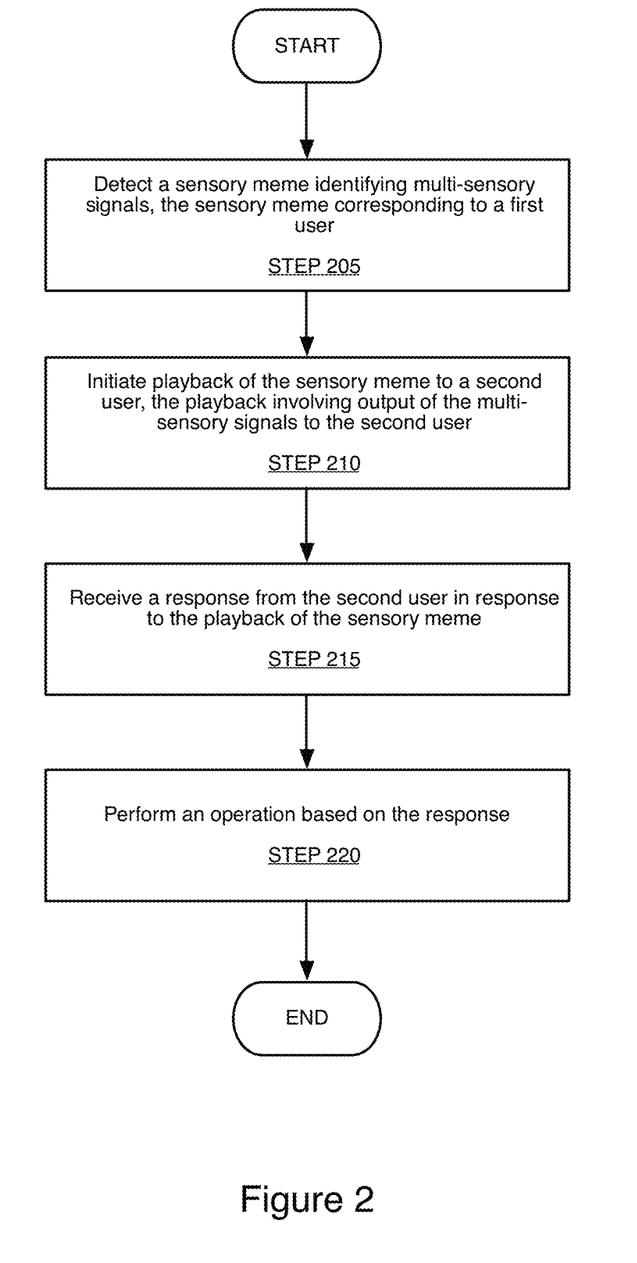
FIGS. 2-4 depict flowcharts of exemplary processes, in accordance with one or more embodiments of the invention.

FIGS. 2-4 show flowcharts of different methods of using sensory memes. While the various steps in the flowcharts are presented and described sequentially, one of ordinary skill will appreciate that some or all of the steps may be executed in different orders and some or all of the steps may be executed in parallel. Further, in one or more embodiments of the invention, one or more of the steps described below may be omitted, repeated, and/or performed in a different order. Accordingly, the specific arrangement of steps shown in FIGS. 2-4 should not be construed as limiting the scope of the invention.

FIG. 2 depicts a method of using a sensory meme. A sensory meme of a first user is received (205). In this example, the sensory meme includes multiple signals selected by the user via a user interface of the user's mobile device. The user may define the sensory meme on their device using any of the methods disclosed herein (e.g., the functionality disclosed in FIG. 5A) (205). The sensory meme is uploaded to an external server of a cellular network for storage.

The server of the cellular network then identifies contacts of the first user and pushes the sensory meme to mobile devices of those users. A second user, who is among the contacts of the first user, then receives a call from the first user on their mobile device. This user's mobile device initiates playback of the sensory meme to indicate the incoming call from the first user (210). The second user selects an option to answer the call (215) and the call is then connected (220). In this way, a uniquely identifying sensory meme can be used as a substitute for a generic ringtone. Other applications involving a variety of different sensory meme based actions can be used.

FIG. 3 depicts another method of using a sensory meme. The sensory meme is received from a first computing device (300) of a user by a server application of a banking platform. The server application stores the sensory meme in a database and associates it with an account of the user in the database.

Later, the server application receives a request from a second computing device to authenticate the user (the request including a username of the user). In response to the request, the server application provides the sensory meme to the second computing device for playback to the user (305). This serves to authenticate the server to the user of the second computing device (by producing the secret sensory meme of the user). The user then, having confidence that the server is not being spoofed by a fraudulent entity, proceeds to provide her credentials to the server in an authentication request (310). The server responds to the request by authenticating the user and providing her banking information to the second computing device (315).

The method of FIG. 2 can also be used in sharing content among users of a social networking platform. A sensory meme can be received from a first user of the platform (300) and provided for playback to other users of the platform (305). After playback, a second user can submit a request to follow the first user (310) and thus receive content authored by the first user (315).

FIG. 4 depicts a method of conveying sentiment using sensory memes. A user of a communication platform creates a sensory meme indicating their current mood. In this example the user selects a soothing audio signal (the sound of rainfall), a warm thermal signal, and an audio signal consisting of the user speaking the words "life is good" (400). In this example, the signals are synchronized temporally to playback in the specific sequence dictated by the user (concurrently). The communication platform sends the sensory meme to a computing device of a designated recipient as a push notification (405). In response to the push notification, the recipient selects an option to initiate playback of the sensory meme (410). The recipients mobile device then plays back the sensory meme according to the specific sequence designated by the first user.

The following section describes various examples of the invention. The examples are included to aid in the understanding of the invention but are not intended to limit the scope of the invention.

Figure 5A:
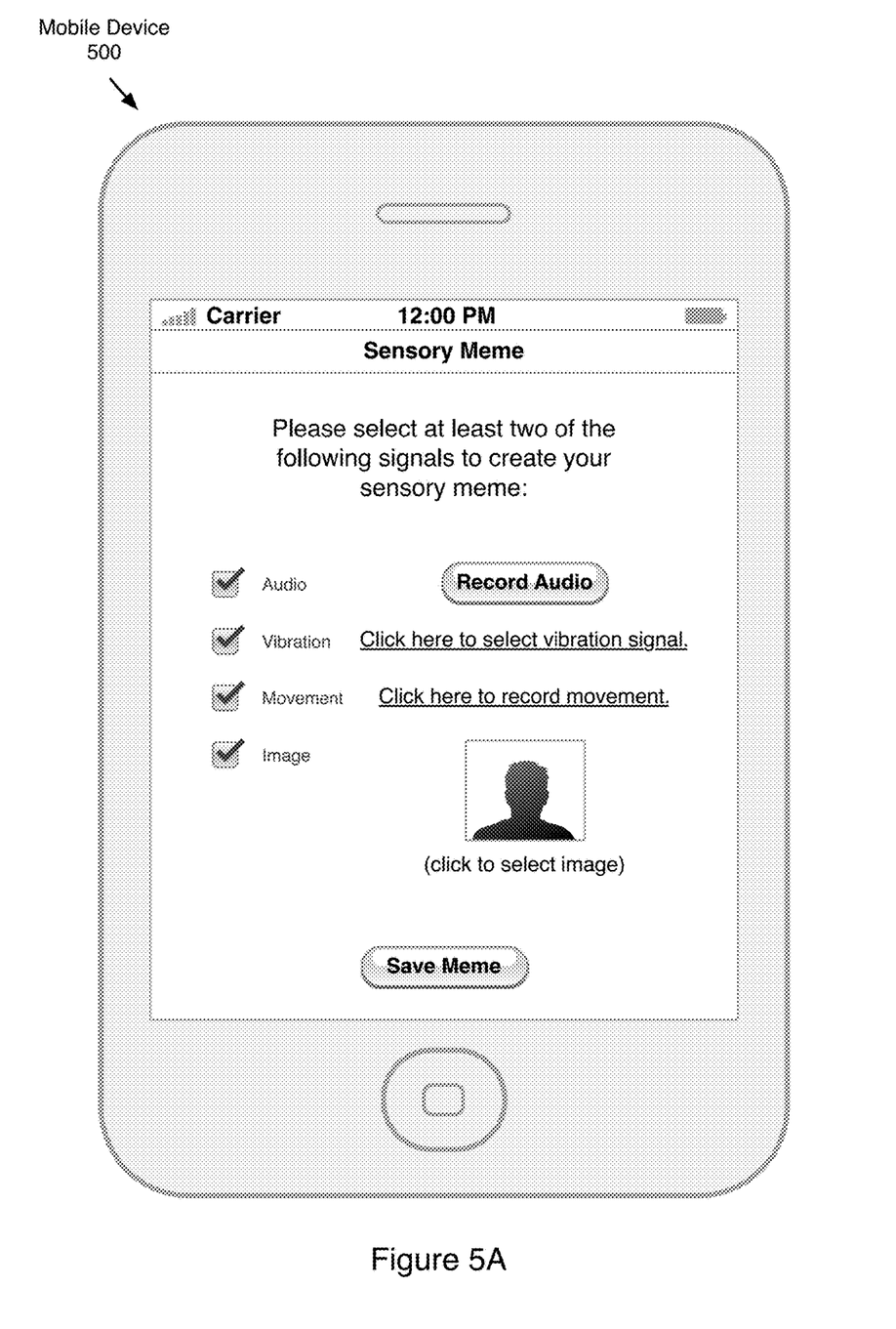
FIGS. 5A, 5B, and 6 depict mockups of mobile applications, in accordance with one or more embodiments of the invention.
Figure 5B:
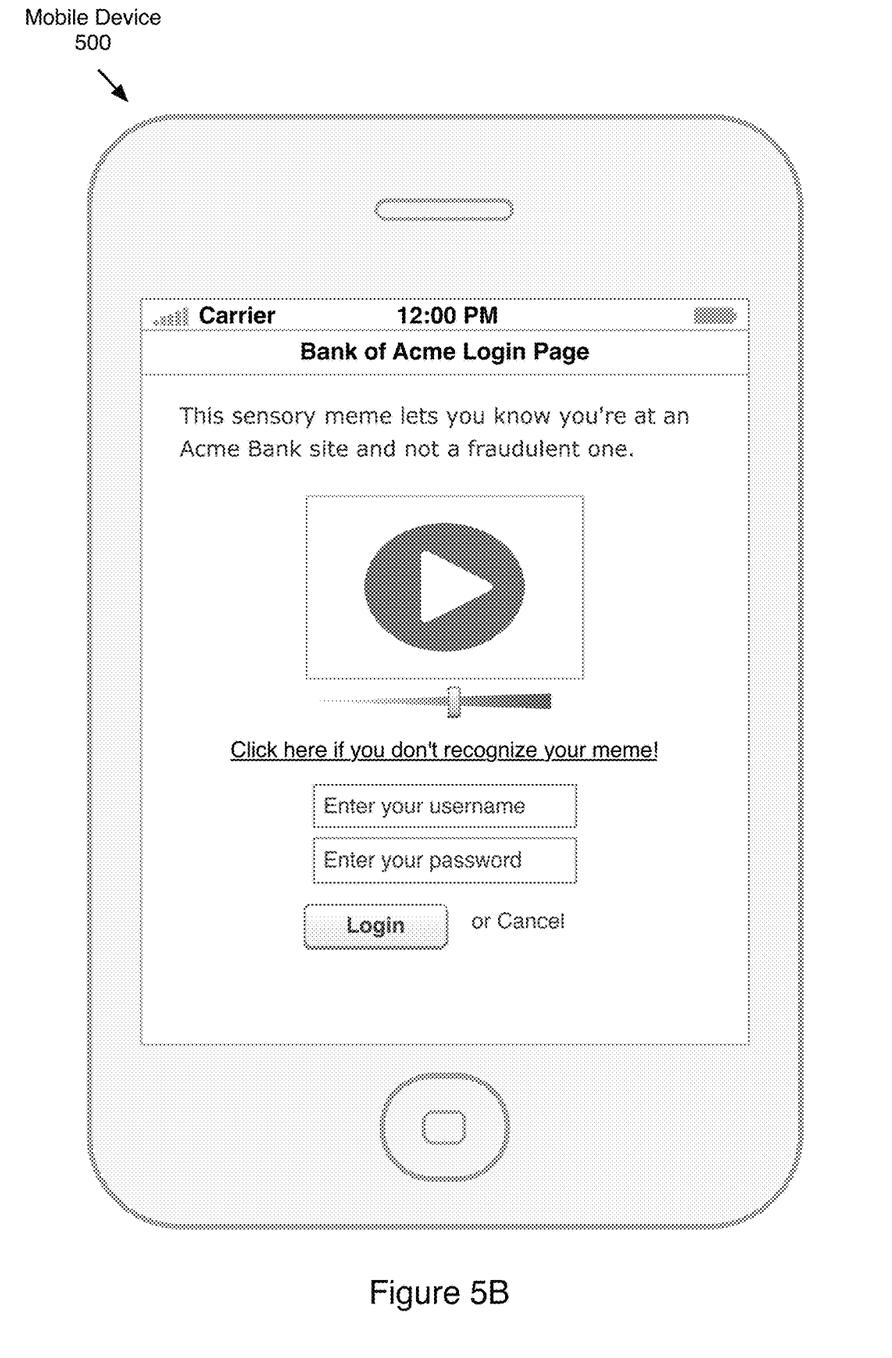

FIGS. 5A and 5B depict examples of mockups of a mobile banking application, in accordance with one embodiment of the invention. In this example, the banking application allows users to define a sensory meme for authentication purposes. Users can create multi-signal memes involving audio, vibration, movement (e.g., a shake pattern of their mobile phone), and/or image signals (see FIG. 5A).

Once the sensory meme is saved, the mobile application uploads it to an external server, which stores and associates the meme with the user's account in a secure database. Anytime the user wishes to login to the banking application, the server provides the sensory meme for playback on the user's device. Upon verification of the meme, the user enters login credentials to verify their identity. Playback of the motion signal of the meme can be achieved in a variety of different ways. For example, direction of the recorded movement can be displayed visually on the mobile device.

Figure 6:
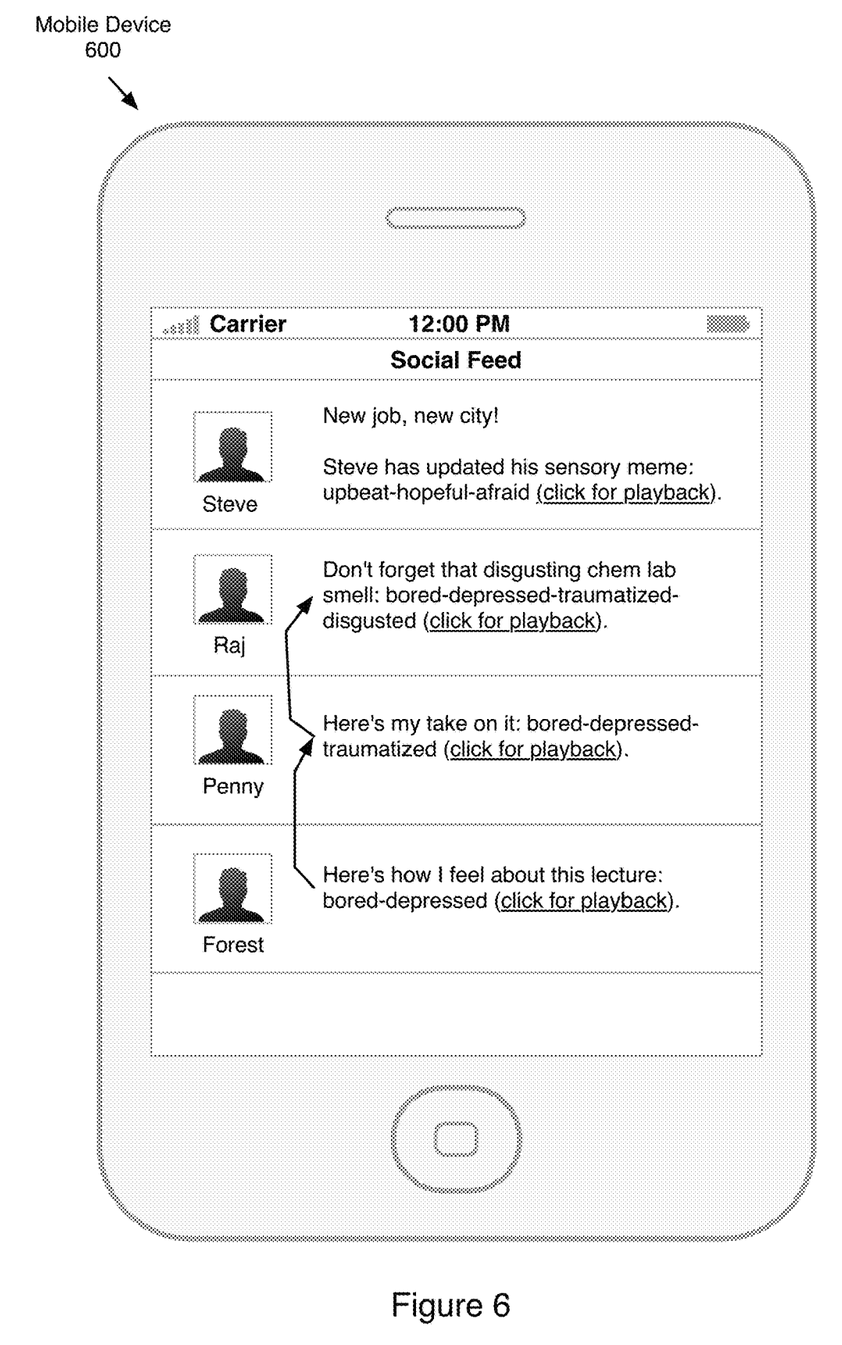

FIG. 6 depicts an example of a mockup of a mobile social networking application, in accordance with one embodiment of the invention. In this example, users of the application broadcast sensory memes to convey their current mood and/or reaction to a common event (e.g., a boring school lecture). Each user creates their sensory meme by assembling/creating/defining a set of sensory signals. The users can select from a set of predefined signals provided by the social network or they can choose to create their own (e.g., by recording an audio message). A server of the social networking platform maintains a mapping of each of the predefined signals to a sentiment value (e.g., happy, bored, lucky, depressed, excited, traumatized, ecstatic, disgusted, etc.). The server's sensory module receives the defined sensory meme's and includes them for broadcast in the feeds of other users (e.g., based on social connections between the users).

For custom signals, the sensory module utilizes a subcomponent called the sentiment module to programmatically assign sentiment values to the custom signals. For audio signals, the frequency and smoothness of the audio signal determine the sentiment value. Smoother and more moderate audio signals convey sentiment values such as "tranquil" and "peaceful", while erratic and extremely high-pitched audio signals convey "chaotic", "scared", and "excited" sentiment values. Low pitched signals convey "depressed", "sad", and "bored" sentiment values.

Continuing the example, a first user ("Forest") broadcasts a sensory meme to which the social networking platform assigns the sentiment values "bored" and "depressed". User "Penny" then responds to Forest's sensory meme by adding another signal, which the social networking platform designates as "traumatized." User "Raj" then adds another signal (an audio message saying "Eww") which the social networking platform tags as "disgusted". The composite sensory meme is shared after each modification in the feed of each user, in accordance with predefined graph relationships among the users.

In another example, a smart bracelet is a low-powered Bluetooth device that connects to a user's mobile phone. The user's phone remains in the user's pocket while the user is having a conversation with a colleague.

During the conversation another colleague calls. That colleague has a custom ringtone which includes a vibrate channel and a color channel in addition to the usual audio channel. Because the phone is on silent (or, e.g., the user's calendar recognizes that the user is in a meeting) the phone remains in quiet mode. So when the phone rings instead of an audio tone, the smart bracelet vibrates with the vibrate pattern of the incoming caller. The vibration may also be accompanied by a flashing light pattern or color pattern. Without interrupting the flow of the user's conversation in the meeting, the user is notified of the call and the identity of the caller. Continuing the example, the user may have previously trained the bracelet to recognize a few call-related gestures. For example, when the user raises an arm up to the user's ear, the user signifies that the user wants to answer the call. By keeping the user's arm in place or lowering it and waving it back-and-forth, the user signifies that the user is busy. The phone declines the call and may send a polite text message asking the caller to try back later.

Figure 7:
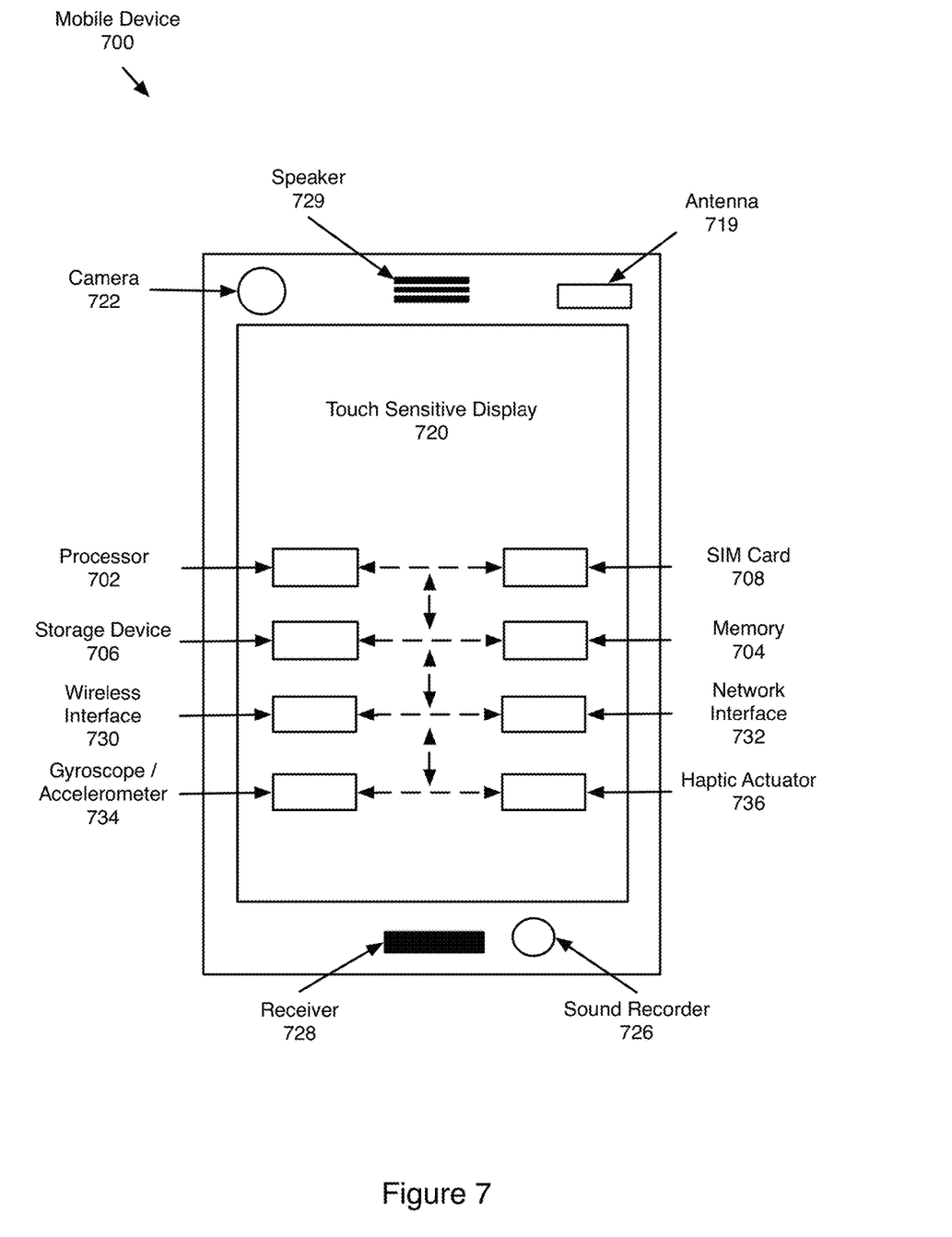
FIG. 7 depicts an example of a mobile device, in accordance with one or more embodiments of the invention.

Embodiments of the invention may be implemented on various mobile or non-mobile computing devices, regardless of the platform being used. In one or more embodiments of the invention, as depicted in FIG. 7, a mobile device (700) can be used to create, receive, and/or transmit (e.g., to sensory system 100 of FIG. 1A, discussed above) one or more sensory memes and/or, more generally, to implement one or more of the user interface related functionality disclosed herein. The mobile device (700) may include any portable device that provides a user interface. Examples of mobile devices may include, but are not limited to, cellular phones, personal digital assistants, personal communicators, tablet computers, smartphones, or any other computing device. The mobile device (700) can include one or more processor(s) (702), memory (704) (e.g., RAM, cache memory, flash memory, etc.), a storage device (706) (e.g., a hard disk, a solid state drive, an optical drive such as a compact disk drive or digital video disk (DVD) drive, a flash memory stick, etc.), a subscriber identification module (SIM) card (708), a speaker (729), an antenna (719), a wireless interface (770), a network interface (732) and numerous other elements and functionalities typical of mobile devices (not shown).

The mobile device (700) may include input means and output means, such as the keyboard (724), the receiver (728), and/or the touch sensitive display device (e.g., a touch liquid crystal display screen) (720), which permits a user to perform gestures (e.g., drag, swipe, multi-touch, select, press and hold, etc.) and enter/display keystrokes (including numeric, alphabetic, and other characters, images, or other media types). Other input devices may include a camera (722), a sound recorder (726), and/or other data recording mechanism. Those skilled in the art will appreciate that these input and output means may take other forms now known or later developed. Using embodiments of the present invention, a consumer may initiate create, edit, and/or share a video vignette using the mobile device (700).

The form factor and functionality of the mobile device (700) can vary in accordance with various embodiments of the invention. For example, as discussed above, the mobile device (700) can include one or more sensory devices (e.g., wearable electronics, biometric, optical, acoustic, mechanical, electrical, etc.) or any combination of devices configured to perform some or all of the functionality described with regard to FIG. 1B.

The mobile device (700) may be connected to a network (e.g., a local area network (LAN), a wide area network (WAN) such as the Internet, or any other similar type of network) via the antenna (719), wireless interface (730), and/or network interface (732). In one or more embodiments of the invention, the network connection may be facilitated by a wireless infrastructure (not shown), including one or more transceivers cooperating to facilitate wireless communications to wireless devices. The wireless infrastructure may include one or more routers, switches, microwave links, base stations, optical fibers, or other similar networking hardware or software components. For example, the wireless infrastructure may be a paging network, a cellular network, etc. In one or more embodiments of the invention, the wireless infrastructure may associate any message received from a mobile device (700) with a mobile device identifier of the mobile device (700).

In one or more embodiments of the invention, the network connection may be facilitated by a hardwired or other similar connection using the network interface (732). For example, the network connection may involve a hardwire connection or short-range wireless connectivity technology with a second mobile device, a printing mechanism, a scanner, or a recording system.

In one or more embodiments of the invention, the gyroscope/accelerometer (734) and haptic actuator (736) are examples of sensory devices embedded within the mobile device (700) and usable in the creation and playback of one or more sensory memes.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer-readable storage media and communication media; non-transitory computer-readable media include all computer-readable media except for a transitory, propagating signal. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared, and other wireless media. Combinations of any of the above can also be included within the scope of computer-readable media.

Figure 8:
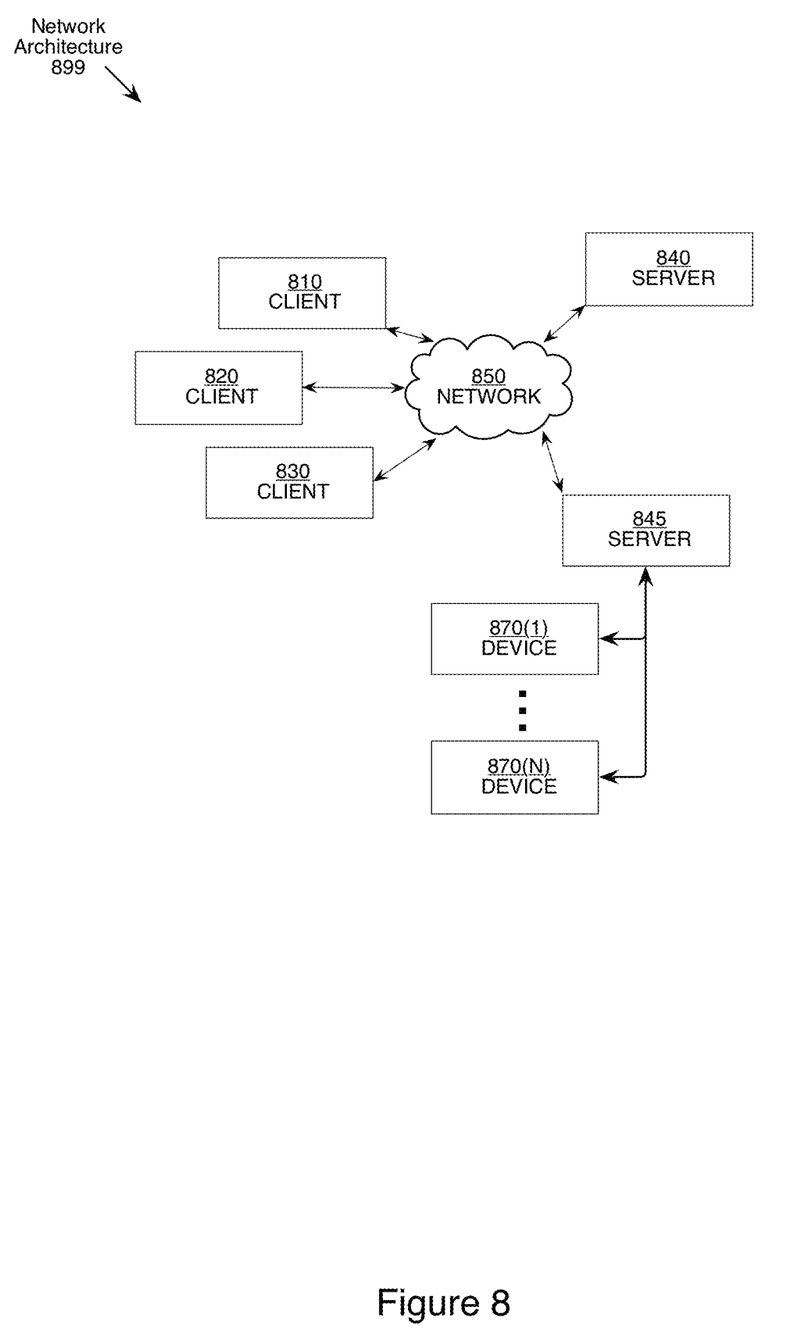
FIG. 8 is a block diagram of an example of a network architecture in which servers and client systems may be coupled to a network, according to one or more embodiments of the invention.

FIG. 8 is a block diagram of an example of a network architecture 899 in which client systems 810, 820, and 830 and servers 840 and 845 may be coupled to a network 850. Client systems 810, 820, and 830 generally represent any type or form of computing device or system, such as clients 127 and 129 of FIG. 1A.

Similarly, servers 840 and 845 generally represent computing devices or systems, such as application servers or database servers, configured to provide various database services and/or run certain software applications (e.g., functionality of sensory module 150 of FIG. 1B, discussed above). Network 850 generally represents any telecommunication or computer network including, for example, an intranet, a wide area network (WAN), a local area network (LAN), a personal area network (PAN), or the Internet.

With reference to mobile device 300 of FIG. 3, a communication interface, such as network interface 332, may be used to provide connectivity between each client system 810, 820, and 830 and network 850. Client systems 810, 820, and 830 may be able to access information on server 840 or 845 using, for example, a Web browser, thin client application, or other client software. Such software may allow client systems 810, 820, and 830 to access data hosted by server 840, server 845, or storage devices 870(1)-(N). Although FIG. 8 depicts the use of a network (such as the Internet) for exchanging data, the embodiments described herein are not limited to the Internet or any particular network-based environment.

In one embodiment, all or a portion of one or more of the example embodiments disclosed herein are encoded as a computer program and loaded onto and executed by server 840, server 845, storage devices 870(1)-(N), or any combination thereof. All or a portion of one or more of the example embodiments disclosed herein may also be encoded as a computer program, stored in server 840, run by server 845, and distributed to client systems 810, 820, and 830 over network 850.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

What is claimed is:

1. A system for using a first sensory meme and a second sensory meme, the system comprising:
    a computer processor;
    a sensory module configured to execute on the computer processor to enable the computer processor to:
        receive, from a sensory application executing on a first computing device, the first sensory meme defined by a first user to convey a first sentiment to a recipient designated by the first user, the first sensory meme comprising a plurality of sensory signals, and the plurality of sensory signals comprising customized sensory information selected by the first user from a menu of sensory options displayed by the sensory application;
        associate a first sentiment value representing the first sentiment with the first sensory meme, wherein the association between the first sentiment value and the first sensory meme is based on one or more attributes of the first sensory meme;
        provide the first sensory meme for playback by a second computing device of the recipient, the playback involving concurrent output of the plurality of sensory signals, the second computing device receiving user input from the recipient in response to playback of the first sensory meme;
        receive a request from the second computing device after playback of the first sensory meme;
        provide content to the second computing device in response to the request; and
        aggregate sentiment information associated with the first sensory meme and the second sensory meme, wherein the second sensory meme is associated with the second computing device.

2. The system of claim 1, wherein the plurality of sensory signals comprise at least one selected from a group consisting of an audio signal, a video signal, a directional signal, an image signal, a light signal, an electrical signal, a thermal signal, and a temporal signal.

3. The system of claim 1, the sensory module further configured to enable the computer processor to:
    receive a request to authenticate the first user as part of a challenge-response technique;
    provide the first sensory meme for playback as part of the challenge-response technique; and
    receive credentials of the first user indicating successful completion of the challenge-response technique.

4. The system of claim 1, wherein the first computing device is a smartphone of the first user, wherein the second computing device comprises contact information of the first user and is a smartphone of the recipient, and wherein the first sensory meme is utilized by the second computing device to associate certain notifications with the first user.

5. The system of claim 4, wherein the first sensory meme comprises an intermittent vibration signal used by the smartphone of the recipient to indicate messages received from the first user.

6. The system of claim 4, wherein the first sensory meme is utilized by the smartphone of the recipient as a ringback tone for representing incoming calls from the first user.

7. The system of claim 1, wherein the sensory module is a component of a social networking platform, and wherein the sensory module is further configured to enable the computer processor to:
    insert the first sensory meme into a feed of content of the recipient having a predefined graph relationship with the first user; and
    aggregate a plurality of interaction information depicting interactions between users of the social networking platform and the first sensory meme.

8. The system of claim 7, wherein the plurality of interaction information comprises response sensory memes of the users of the social networking platform, and wherein the sensory module is further configured to enable the computer processor to:

create a composite sensory meme using the plurality of sensory signals from the first sensory meme and the response sensory memes of the users of the social networking platform; and provide the composite sensory meme for inclusion in the feed.

9. The system of claim 8, wherein the sensory module comprises a sentiment module configured to:

map each of the first sensory meme and the response sensory memes to the first sentiment value of a group of predefined sentiment values; and map the composite sensory meme to a second sentiment value of the group of predefined sentiments values based on the first sentiment values, the second sentiment value representing an aggregate sentiment of the first user and the users of the social networking platform.

10. The system of claim 1, further comprising:
the first computing device configured to:
   present a predefined set of sensory signals to the first user; and
   receive, from the first user, selection of the plurality of sensory signals from among the predefined set; and
the second computing device configured to:
   perform playback of the first sensory meme in conjunction with an authentication request.

11. A method for using a first sensory meme and a second sensory meme, the method comprising:

receiving, from a sensory application executing on a first computing device, the first sensory meme defined by a first user to convey a first sentiment to a recipient designated by the first user, the first sensory meme comprising a plurality of sensory signals, and the plurality of sensory signals comprising customized sensory information selected by the first user from a menu of sensory options displayed by the sensory application;

associating a first sentiment value representing the first sentiment with the first sensory meme, wherein the association between the first sentiment value and the first sensory meme is based on one or more attributes of the first sensory meme;

providing, by a computer processor, the first sensory meme for playback by a second computing device of the recipient, the playback involving concurrent output of the plurality of sensory signals, the second computing device receiving user input from the recipient in response to playback of the first sensory meme;

receiving a request from the second computing device after playback of the first sensory meme;

providing, by a computer processor, content to the second computing device in response to the request; and aggregating sentiment information associated with the first sensory meme and the second sensory meme, wherein the second sensory meme is associated with the second computing device.

12. The method of claim 11, further comprising:
receiving a request to authenticate the first user as part of a challenge-response technique;
providing the first sensory meme for playback as part of the challenge-response technique; and
receiving credentials of the first user indicating successful completion of the challenge-response technique.

13. A method for conveying sentiment using a first sensory meme and a second sensory meme, the method comprising:

creating a first sensory meme comprising a combination of temporally related plurality of sensory signals selected by a first user, the first sensory meme conveying a sentiment of the first user to a recipient designated by the first user, the plurality of sensory signals comprising customized sensory information selected by the first user from a menu of sensory options displayed by a sensory application;

associating a first sentiment value representing the sentiment with the first sensory meme, wherein the association between the first sentiment value and the first sensory meme is based on one or more attributes of the first sensory meme;

sending, using a communication platform, the first sensory meme to a first computing device of the recipient;

presenting, by the first computing device, an indication of the first sensory meme to the recipient, the indication representing the first sentiment value and an option to initiate playback of the plurality of sensory outputs; and aggregating sentiment information associated with the first sensory meme and the second sensory meme, wherein the second sensory meme is associated with the first computing device.

14. The method of claim 13, wherein the plurality of sensory signals comprise at least one selected from a group consisting of an audio signal, a video signal, a directional signal, an image signal, a light signal, an electrical signal, a thermal signal, and a temporal signal.

15. The method of claim 13, wherein a second computing device is a smartphone of the first user, wherein the first computing device comprises contact information of the first user and is a smartphone of the recipient, and wherein the first sensory meme is utilized by the first computing device to associate certain notifications with the first user.

16. The method of claim 15, wherein the first sensory meme comprises an intermittent vibration signal used by the smartphone of the recipient to indicate messages received from the first user.

17. The method of claim 13, further comprising:
inserting the first sensory meme into a feed of content of the recipient having a predefined graph relationship with the first user; and
aggregating a plurality of interaction information depicting interactions between users of a social networking platform and the first sensory meme.

18. The method of claim 17, further comprising:
creating a composite sensory meme using the plurality of sensory signals from the first sensory meme and response sensory memes of the users of the social networking platform;
creating the composite sensory meme for inclusion in the feed; and
wherein the plurality of interaction information comprises the response sensory memes of the users of the social networking platform.

19. The method of claim 18, further comprising:
mapping each of the first sensory meme and the response sensory memes to the first sentiment value of a group of predefined sentiment values; and
mapping the composite sensory meme to a second sentiment value of the group of predefined sentiments values based on the first sentiment values, the second sentiment value representing an aggregate sentiment of the first user and the users of the social networking platform.

* * * * *